United States Patent
Nuttall, Jr. et al.

(10) Patent No.: US 8,018,607 B2
(45) Date of Patent: Sep. 13, 2011

(54) SCANNER POWER MANAGEMENT SYSTEM AND METHOD

(75) Inventors: Gordon R. Nuttall, Jr., Fort Collins, CO (US); Eric F. Aas, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2699 days.

(21) Appl. No.: 10/310,469

(22) Filed: Dec. 5, 2002

(65) Prior Publication Data

US 2004/0109192 A1   Jun. 10, 2004

(51) Int. Cl.
*H04N 1/04* (2006.01)
*G06F 1/26* (2006.01)

(52) U.S. Cl. ....... 358/1.14; 358/474; 358/442; 358/468; 358/497; 713/300; 713/320; 713/340

(58) Field of Classification Search .................. 358/442, 358/474, 497, 494, 468, 505, 1.14; 382/312, 382/318, 319; 713/300, 320, 340; 348/373
See application file for complete search history.

(56) References Cited

U.S. PATENT DOCUMENTS

| | | | | |
|---|---|---|---|---|
| 5,825,505 A * | 10/1998 | Toyoda et al. | ................. | 358/400 |
| 5,845,144 A * | 12/1998 | Tateyama et al. | ................. | 712/1 |
| 6,002,508 A * | 12/1999 | Mai | ................ | 359/212 |
| 6,031,636 A * | 2/2000 | Chen | .......................... | 358/442 |
| 6,172,360 B1 * | 1/2001 | Khovaylo et al. | ............. | 250/235 |
| 6,357,011 B2 * | 3/2002 | Gilbert | .......................... | 713/300 |
| 6,389,183 B1 | 5/2002 | Han | ................. | 382/313 |
| 6,396,481 B1 | 5/2002 | Challa et al. | ................... | 345/169 |
| 6,427,917 B2 | 8/2002 | Knowles et al. | ......... | 235/462.44 |
| 6,473,811 B1 * | 10/2002 | Onsen | ............................ | 710/15 |
| 6,710,768 B2 * | 3/2004 | Muranami | .................... | 345/166 |
| 6,710,899 B2 * | 3/2004 | Chung et al. | .................. | 358/475 |
| 6,791,720 B1 * | 9/2004 | Hsieh | ................. | 358/473 |
| 6,963,429 B2 * | 11/2005 | Suzuki et al. | ................. | 358/474 |
| 6,995,877 B2 * | 2/2006 | Suzuki | .......................... | 358/474 |
| 7,133,031 B2 * | 11/2006 | Wang et al. | ................... | 345/173 |
| 2002/0015174 A1 * | 2/2002 | Nanpei | ........................ | 358/1.14 |
| 2002/0093583 A1 * | 7/2002 | Ito | ................................. | 348/373 |
| 2003/0112476 A1 * | 6/2003 | Chen et al. | .................... | 358/474 |
| 2005/0128532 A1 * | 6/2005 | Wang et al. | .................... | 358/474 |
| 2005/0240784 A1 * | 10/2005 | Sugasawa | ..................... | 713/300 |
| 2005/0267999 A1 * | 12/2005 | Suematsu et al. | ............... | 710/14 |

FOREIGN PATENT DOCUMENTS

| | | | |
|---|---|---|---|
| JP | 2001166854 | | 6/2001 |
| JP | 2001166854 A | * | 6/2001 |
| JP | 2001211274 | | 8/2001 |
| JP | 2002218167 | | 8/2002 |

OTHER PUBLICATIONS

UK Search Report dated Apr. 27, 2004; 2 pages.

* cited by examiner

*Primary Examiner* — Cheukfan Lee

(57) ABSTRACT

A power management system for a scanner device comprises an onboard power source and an interface port adapted to receive power from a remote host. The system also comprises a power manager accessible by a processor and adapted to automatically determine whether to draw power for an operating-mode from the onboard power source or the remote host.

38 Claims, 3 Drawing Sheets

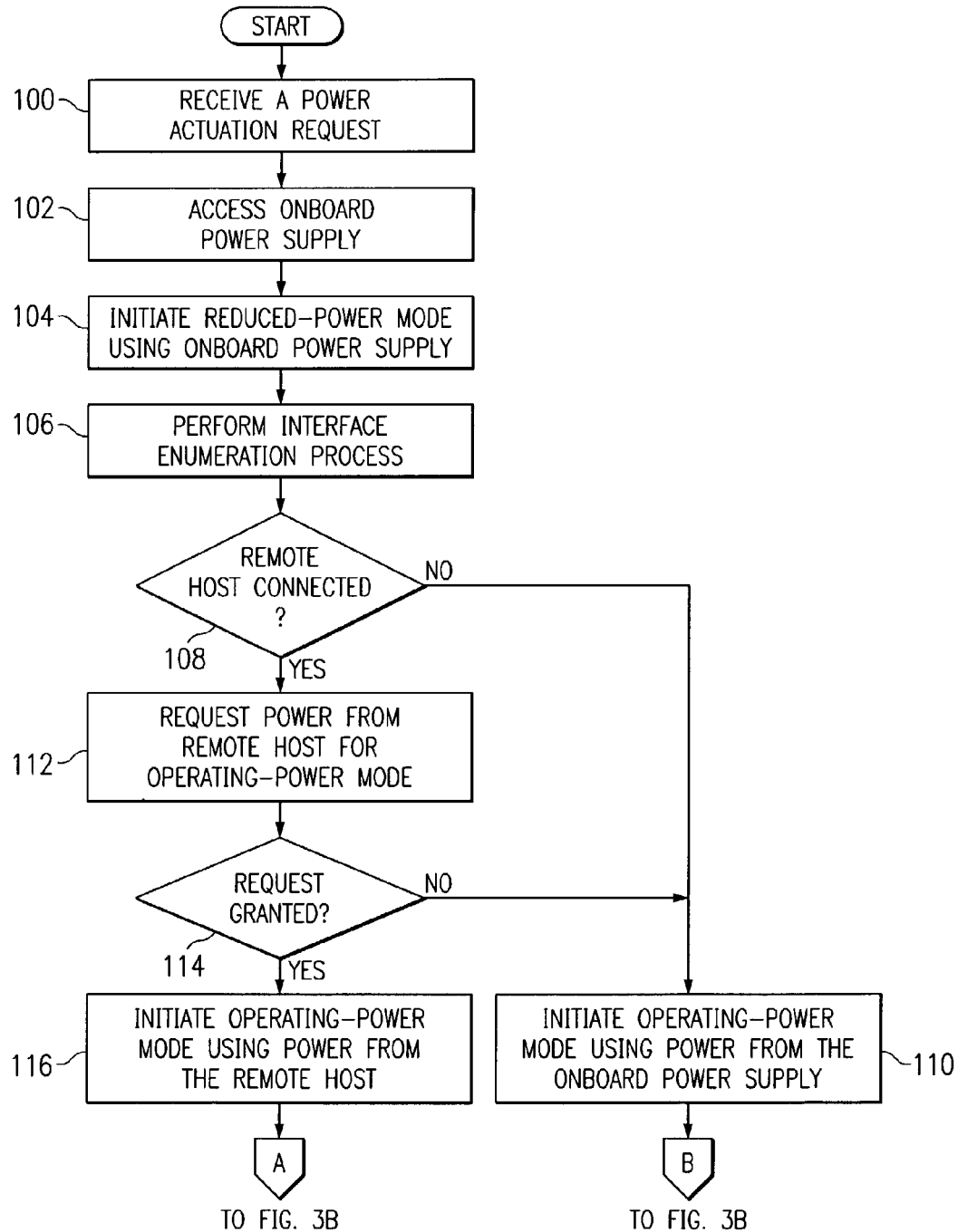

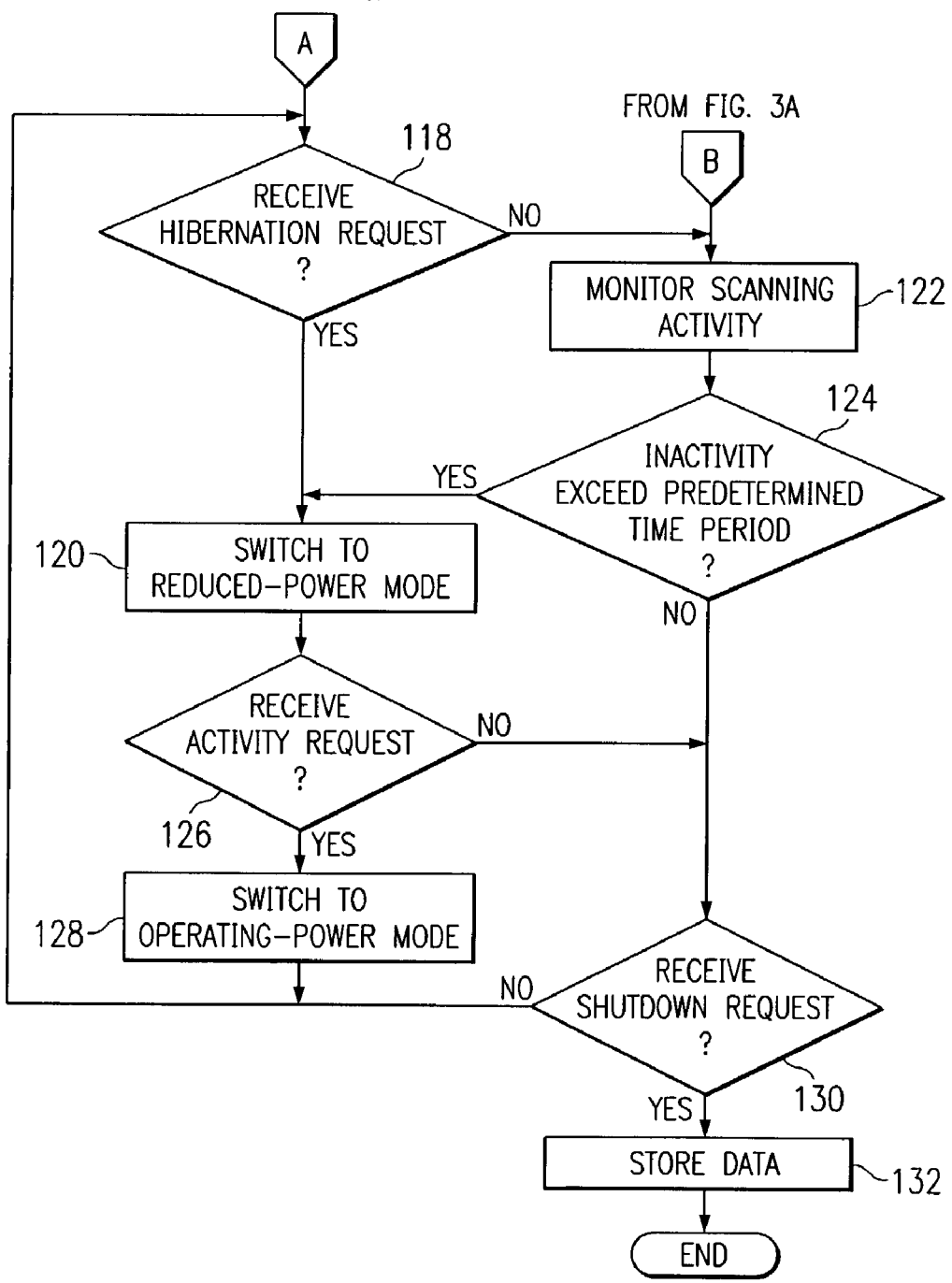

SCANNER POWER MANAGEMENT SYSTEM AND METHOD

TECHNICAL FIELD OF THE INVENTION

The present invention relates generally to the field of scanner devices and, more particularly, to a scanner power management system and method.

BACKGROUND OF THE INVENTION

As the sophistication of electronic equipment continues to increase, power demand and consumption also generally increases. For example, as functionality increases, the power required to support the functionality also increases. Accordingly, providing the required power and conserving power for many types of electronic equipment continues to be an important concern.

SUMMARY OF THE INVENTION

In accordance with one embodiment of the present invention, a power management system for a scanner device comprises an onboard power source and an interface port adapted to receive power from a remote host. The power management system also comprises a power manager accessible by a processor and adapted to automatically determine whether to draw power for an operating-power mode from the onboard power source or the remote host.

In accordance with another embodiment of the present invention, a power management method for a scanner device comprises receiving a power actuation request and automatically initiating a reduced-power mode using power from an onboard power source in response to the request.

BRIEF DESCRIPTION OF THE DRAWINGS

For a more complete understanding of the present invention and the advantages thereof, reference is now made to the following descriptions taken in connection with the accompanying drawings in which:

FIG. 3 is a flow chart illustrating an embodiment of a power management method for a scanner device in accordance with the present invention.

DETAILED DESCRIPTION OF THE DRAWINGS

Figure 1:
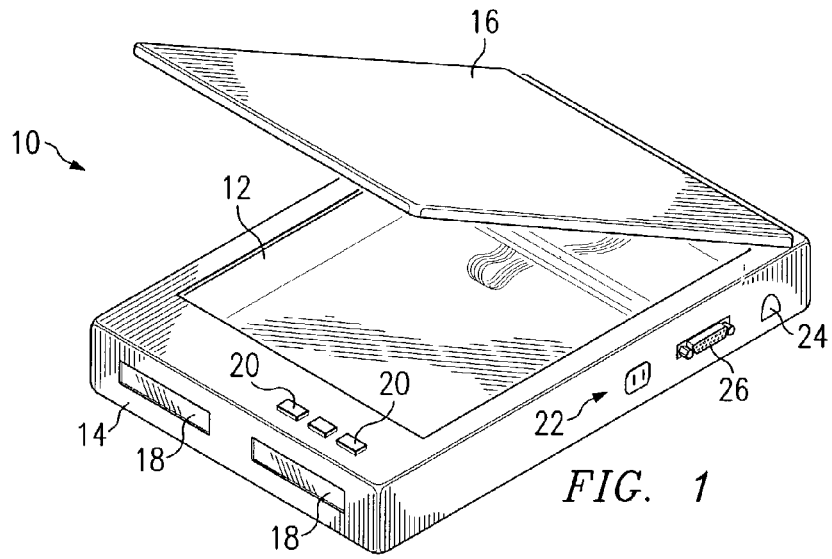
FIG. 1 is a diagram illustrating a scanner device employing an embodiment of a power management system in accordance with the present invention.
Figure 2:
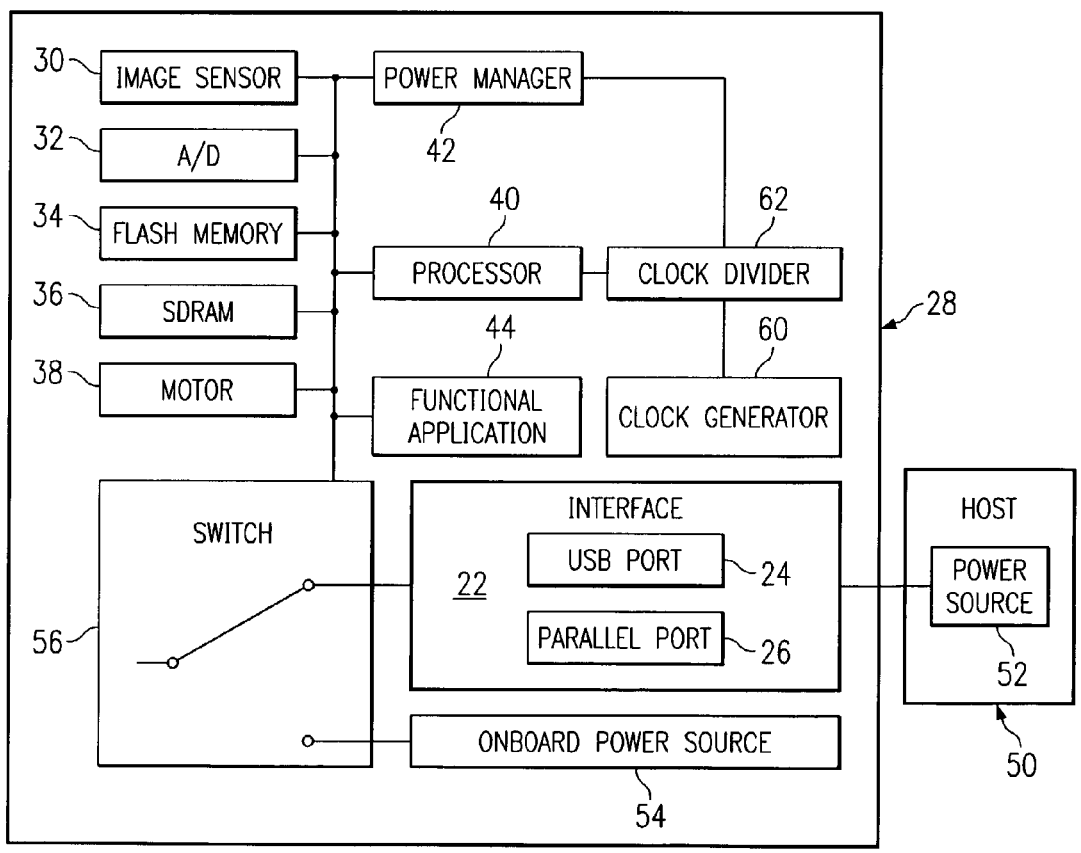
FIG. 2 is a block diagram illustrating an embodiment of the power management system in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating a scanner device 10 employing an embodiment of a power management system and method in accordance with the present invention. In the illustrated embodiment, scanner device 10 comprises a portable, flatbed scanner; however, it should be understood that the power management system and method of the present invention may be incorporated into any device configured to perform a scanning operation such as, but not limited to, a facsimile machine, a check or bar code reader device, a copier, or other types of document or image scanning equipment. In the illustrated embodiment, scanner device 10 comprises a platen 12 coupled to a base 14 for receiving documents to be scanned. Scanner device 10 also comprises a cover or lid 16 coupled to base 14 via a hinge or other type of structure (not explicitly shown) providing movement of lid 16 relative to base 14.

In the illustrated embodiment, scanner device 10 comprises at least one media interface 18 for receiving various types of storage media, such as, but not limited to, floppy discs, compact discs, non-volatile memory cards or media sticks. Scanner device 10 also comprises at least one functional button, pad or key 20 for initiating various functions relating to scanner device 10, such as, but not limited to, a scan key, a print key, an on/off or power button, or other type of pad for initiating a particular function. In the illustrated embodiment, scanner device 10 also comprises at least one interface 22 for coupling scanner device 10 to another device. For example, in the illustrated embodiment, interface 22 comprises a universal serial bus (USB) interface 24 and a parallel interface 26. However, it should be understood that other types of interface(s) 22 may be used to couple scanner device 10 to other device(s).

FIG. 2 is a block diagram illustrating an embodiment of a scanner power management system 28 in accordance with the present invention. As described above, power management system 28 may be incorporated into any scanner device 10 configured to perform a scanning operation such as, but not limited to, a document scanner, a facsimile machine, or a check or bar code reader device. In the illustrated embodiment, system 28 comprises an image sensor 30, an analog-to-digital (A/D) converter 32, flash memory 34, synchronous dynamic random access memory (SDRAM) 36, and a motor 38. Image sensor 30 is used to scan a document disposed on platen 12 of scanner device 10. Motor 38 is used to move image sensor 30 relative to platen 12 to scan the document. Converter 32 is used to convert digital information into analog format, or analog information into digital format. Memories 34 and 36 are used to store various types of information within scanner device 10.

In the illustrated embodiment, system 28 also comprises a processor 40 adapted to access a power manager 42 and a functional application 44. Power manager 42 and functional application 44 may comprise software, hardware, or a combination of software and hardware. Briefly, functional application 44 processes, controls or performs at least one function for scanner device 10, such as, but not limited to, initiating scanning of a document, managing motor 38 speed and control, and retrieving or storing information to memories 34 and/or 36. Power manager 42 automatically controls and selects a source of power for operating scanner device 10 in a variety of power consumption modes and automatically monitors conditions of scanner device 10 for controlling and selecting various power consumption modes.

As illustrated in FIG. 2, scanner device 10 may be coupled to a remote host 50 via interface(s) 22, such as USB port 24 or parallel port 26. In this embodiment, only a single host 50 is illustrated; however, it should be understood that scanner device 10 may be coupled to additional hosts 50. Host 50 may comprise a computer, workstation, server, or other type of device capable of delivering power to scanner device 10 via a power source 52. Power source 52 may comprise a source of power located onboard host 50 or remote from host 50 from which host 50 may draw and/or supply power. As further illustrated in FIG. 2, system 28 also comprises an onboard power source 54. Onboard power source 54 may comprise batteries or any other type of source of power such that scanner device 10 may be operated independently of a connection to another device.

In operation, power manager 42 automatically determines whether to draw power for operating scanner device 10 from either onboard power source 54 or remote host 50. For example, scanner device 10 may also comprise a programmable switch 56 that may be actuated to switch from either onboard power source 54 or remote host 50 for providing power for various operating modes of scanner device 10. In operation, for example, in response to receiving a power on or actuation request, power manager 42 may initiate a reduced-power operating mode such that a reduced level of power is drawn from onboard power source 54. During the reduced-power operating mode, power manager 42 operates processor 40 at a reduced clock speed while drawing minimal levels of power from onboard power source 54. For example, as illustrated in FIG. 2, system 28 comprises a clock generator 60 and a clock divider 62. In operation, power manager 42 controls the clock speed via clock divider 62 during the reduced-power operating mode to accommodate the reduced power draw from onboard power source 54.

After initiation of the reduced-power operating mode, power manager 42 performs an enumeration process to identify any devices that may be coupled to scanner device 10 via interface(s) 22. If power manager 42 determines that a remote host 50 is coupled to interface(s) 22, power manager 42 communicates with host 50 to determine whether host 50 can supply power for an operating-power mode. For example, in operating-power mode, scanner device 10 may be operated at an increased power level or a normal power level to support operation of functional application 44, image sensor 30, converter 32, and/or motor 38 such that general operations of scanner device 10 may be performed. If host 50 is configured for supplying power to scanner device 10, power manager 42 requests a supply of power from remote host 50 to support operating-power mode. If host 50 grants the requested power to scanner device 10, power manager 42 automatically actuates switch 56 to draw power from host 50 and initiates the operating-power mode. If host 50 does not grant the requested power, power manager 42 initiates the operating-power mode using power supplied by onboard power source 54.

Power manager 42 may also be configured to monitor activity of scanner device 10 such that in response to a predetermined time period of inactivity, power manager automatically switches from operating-power mode to the reduced-power mode. For example, scanner device 10 may be operating at the operating-power mode using power supplied by either host 50 or onboard power source 54. After a predetermined time period of inactivity, power manager 42 may automatically switch from the operating-power mode to the reduced-power mode to conserve power usage by scanner device 10.

Power manager 42 may also automatically switch from operating-power mode to reduced-power mode in response to receiving a signal from host 50. For example, host 50 may transmit a sleep or hibernation signal to scanner device 10 indicating a reduced level of power may be available or supplied from host 50. In response to receiving the hibernation signal from host 50, power manager 42 automatically switches from operating-power mode to reduced-power mode. Additionally, power supplied by host 50 ceases, power manager 42 may automatically actuate switch 56 and begin drawing power from onboard power source 54. If operation of scanner device 10 to perform a scanning or other function is desired or required during a hibernation period, power manager 42 may automatically actuate switch 56 to draw power from onboard power source 54 to draw the required power to support a desired application or function. For example, host 50 may have transmitted a hibernation signal to scanner device 10 such that a reduced power level is supplied by host 50. Accordingly, power manager 42 automatically switches to reduced-power mode. However, a user of scanner device 10 may desire to perform a particular function using scanner device 10, thereby requiring operation at the operating-power mode. Thus, in response to a user-requested function, power manager 42 may automatically switch to drawing power from onboard power source 54 to supply the required level of power for operating various features and functions of scanner device 10.

In response to receiving a shutdown request, or power off request, from a user of scanner device 10, power manager 42 may also switch from operating-power mode to the reduced-power mode prior to shutting down. For example, in response to a shutdown request, information stored in memory 36 may be stored in flash memory 34 prior to ceasing operations of scanner device 10. In response to the shutdown request, power manager 42 may initiate the reduced-power mode using power supplied from either onboard power source 54 or host 50.

FIG. 3 is a flowchart illustrating an embodiment of a power management method for scanner device 10 in accordance with the present invention. The method begins at block 100, where scanner device 10 receives a power actuation request. For example, a user of scanner device 10 may depress or otherwise actuate a functional key 20 to initiate operation and use of scanner device 10. At block 102, power manager 42 accesses onboard power source 54 in response to the power actuation request. At block 104, power manager 42 initiates a reduced-power mode using power supplied via onboard power source 54.

At block 106, power manager 42 determines whether remote host 50 is coupled to scanner device 10. For example, power manager 42 may initiate an enumeration process to determine the types of devices coupled to scanner device 10 via interface(s) 22. At decisional block 108, a determination is made whether remote host 50 is coupled to scanner device 10 via interface 22. If remote host 50 is not coupled to scanner device 10, the method proceeds to block 110, where power manager 42 initiates operating-power mode using power supplied via the onboard power source 54. If the remote host 50 is coupled to scanner device 10, the method proceeds from block 108 to block 112, where power manager 42 requests power from remote host 50 for operating-power mode of scanner device 10.

At decisional block 114, a determination is made whether remote host 50 grants the power requested by power manager 42 for the operating-power mode of scanner device 10. If host 50 does not grant the power request, the method proceeds from block 114 to block 110. If remote host 50 does grant the power request, the method proceeds from block 114 to block 116, where power manager 42 initiates the operating-power mode of scanner device 10 using power supplied from remote host 50.

At decisional block 118, a determination is made whether a hibernation signal has been received from remote host 50. If a hibernation signal has been received from remote host 50, the method proceeds to block 120, where power manager 42 automatically switches from the operating-power mode to the reduced-power mode. If a hibernation signal has not been received from remote host 50, the method proceeds from block 118 to block 122.

At block 122, power manager 42 monitors activity relative to scanner device 10. At decisional block 124, a determination is made whether inactivity relative to scanner device 10 has exceeded a predetermined time period. If inactivity has exceeded a predetermined time period, the method proceeds from block 124 to block 120, where power manager 42 automatically switches from an operating-power mode to the reduced-power mode. If inactivity has not exceeded a predetermined time period, the method proceeds from block 124 to block 130.

After block 120, the method proceeds to block 126, where a determination is made whether an activity request is made by a user of scanner device 10. For example, during a reduced-power mode, a user may request to scan a particular document or access a scanned image from either memory 34 or memory 36. If an activity request has not been received, the method proceeds from block 126 to block 130. If an activity request has been received, the method proceeds from block 126 to block 128, where power manager 42 automatically switches from reduced-power mode to the operating-power mode. The method then returns to block 118.

At decisional block 130, a determination is made whether a shutdown request has been received from a user of scanner device 10. If a shutdown request has not been received, the method returns to block 118. If a shutdown request has been received, the method proceeds to block 132, where data accumulated by scanner device 10 is stored in memory 34.

What is claimed is:

1. A power management system for a scanner device, comprising:
    an onboard power source;
    an interface adapted to receive power from a remote host; and
    a power manager accessible by a processor and adapted to automatically determine whether to draw power for the scanner device from the onboard power source or the remote host, and
    wherein the power manager is adapted to initiate a reduced-power mode of the scanner device using power supplied by the onboard power source in response to one of a power on request and a power off request for the scanner device, and is adapted to initiate an operating-power mode of the scanner device using power supplied by the remote host to perform a scanning function of the scanner device,
    wherein the power manager is further adapted to actuate a switch to draw power for the operating-power mode of the scanner device from the onboard power source or the remote host.

2. The system of claim 1, wherein the power manager is adapted to automatically detect a connection of the scanner device to the remote host.

3. The system of claim 1, wherein the power manager is adapted to automatically request power for the operating-power mode of the scanner device from the remote host in response to detecting a connection of the scanner device to the remote host.

4. The system of claim 1, wherein the power manager is adapted to draw power from the onboard power source for the operating-power mode of the scanner device in response to detecting an absence of a connection of the scanner device to the remote host.

5. The system of claim 1, wherein the power manager is adapted to initiate the reduced-power mode of the scanner device in response to receiving a signal from the remote host.

6. The system of claim 1, wherein the power manager is adapted to operate a functional application of the scanner device at a reduced clock speed during the reduced-power mode.

7. The system of claim 1, wherein the power manager is adapted to automatically store scanned data to a memory of the scanner device in response to a shutdown request for the scanner device.

8. The system of claim 1, wherein the power manager is adapted to automatically initiate the reduced-power mode of the scanner device in response to a predetermined time period of inactivity.

9. A power management method for a scanner device, comprising:
    receiving a request for one of power on and power off of the scanner device;
    automatically initiating a reduced-power mode of the scanner device using power from an onboard power source in response to the request;
    initiating an operating-power mode of the scanner device using power from a remote host for performing a scanning function of the scanner device;
    automatically switching from drawing power for the operating-power mode of the scanner device from the onboard power source to drawing power for the operating-power mode of the scanner device from the remote host.

10. The method of claim 9, further comprising requesting power for the operating-power mode of the scanner device from the remote host in response to detecting a connection of the scanner device to the remote host.

11. The method of claim 9, further comprising automatically drawing power for the operating-power mode of the scanner device from the onboard power source in response to detecting an absence of a connection of the scanner device to the remote host.

12. The method of claim 9, further comprising operating a functional application of the scanner device at a reduced clock speed during the reduced-power mode.

13. The method of claim 9, further comprising automatically storing scanned data to a memory of the scanner device in response to receiving a shutdown request for the scanner device.

14. The method of claim 9, further comprising automatically switching from the operating-power mode of the scanner device to the reduced-power mode of the scanner device in response to receiving a signal at the scanner device from the remote host.

15. The method of claim 9, further comprising automatically switching from the operating-power mode of the scanner device to the reduced-power mode of the scanner device in response to a predetermined time period of inactivity.

16. The method of claim 9, wherein receiving the request includes receiving a request for power on of the scanner device, and wherein automatically initiating the reduced-power mode includes initiating the reduced-power mode of the scanner device using power from the onboard power source in response to the power on request.

17. The method of claim 9, wherein receiving the request includes receiving a request for power off of the scanner device, and wherein automatically initiating the reduced-power mode includes initiating the reduced-power mode of the scanner device using power from the onboard power source in response to the power off request.

18. The method of claim 9, further comprising automatically detecting whether the remote host is coupled to an interface port of the scanner device.

19. A power management system for a scanner device, comprising:
    means for connecting the scanner device to a remote host;
    means for supplying onboard power for the scanner device;

means for automatically determining whether to draw power for the scanner device from the onboard power means or the remote host;

means for requesting power from the onboard power means for a reduced-power mode of the scanner device in response to detecting a power on request or a power off request of the scanner device;

means for requesting power from the remote host for an operating-power mode of the scanner device in response to detecting a connection of the scanner device to the remote host; and means for switching from the operating-power mode to the reduced-power mode in response to receiving a signal at the scanner device from the remote host.

20. The system of claim 19, further comprising means for drawing power from the onboard power means in response to detecting an absence of a connection of the scanner device to the remote host.

21. The system of claim 19, further comprising means for operating a functional application of the scanner device at a reduced clock speed during the reduced-power mode.

22. The system of claim 19, further comprising means for switching between drawing power for the scanner device from the onboard power means or the remote host.

23. The system of claim 19, further comprising means for storing data to a memory of the scanner device in response to receiving a shutdown request for the scanner device.

24. The system of claim 19, wherein the scanner device operates in the operating-power mode to perform a scanning function.

25. A method for producing a power management system for a scanner device, comprising:

providing an onboard power source for the scanner device;

providing an interface adapted to communicate the scanner device with a remote host; and providing a power manager adapted to:
  automatically determine whether to draw power for the scanner device from the onboard power source or the remote host;
  automatically request power from the onboard power source for a reduced-power mode of the scanner device in response to a power on request or a power off request of the scanner device;
  automatically request power from the remote host for an operating-power mode of the scanner device in response to detecting a connection of the scanner device to the remote host via the interface; and
  draw power for the operating-power mode of the scanner device from the onboard power source in response to detecting an absence of the connection of the scanner device to the remote host via the interface.

26. The method of claim 25, further comprising providing a clock divider adapted to operate a functional application of the scanner device at a reduced clock speed during the reduced-power mode.

27. The method of claim 25, further comprising providing the power manager adapted to automatically detect the connection of the scanner device to the remote host via the interface.

28. The method of claim 25, further comprising providing the power manager adapted to automatically switch from the operating-power mode of the scanner device to the reduced-power mode of the scanner device in response to receiving a signal from the remote host.

29. The method of claim 25, further comprising providing the power manager adapted to automatically switch from the operating-power mode of the scanner device to the reduced-power mode of the scanner device in response to a predetermined time period of inactivity.

30. The method of claim 25, further comprising automatically actuating a switch coupled to the interface and the onboard power source in response to determining to draw power for the operating-power mode of the scanner device from the remote host.

31. The method of claim 25, wherein the scanner device operates in the operating-power mode to perform a scanning function.

32. A power management method for a scanner device, comprising:

operating the scanner device at a reduced-power mode in response to receiving a power on request for the scanner device;

receiving a request to perform a scanning function;

automatically determining whether to draw power from an onboard power source of the scanner device or a remote host to switch from the reduced-power mode of the scanner device to an operating-power mode of the scanner device to perform the scanning function;

automatically actuating a switch to draw power for the operating-power mode of the scanner device from the onboard power source or the remote host.

33. The method of claim 32, further comprising automatically determining whether the remote host is coupled to an interface port of the scanner device.

34. The method of claim 32, further comprising requesting power from the remote host for the operating-power mode of the scanner device to perform the scanning function in response to detecting a connection of the scanner device to the remote host.

35. The method of claim 32, further comprising automatically drawing power to perform the scanning function at the operating-power mode from the onboard power source of the scanner device in response to detecting an absence of a connection of the scanner device to the remote host.

36. The method of claim 32, wherein operating the scanner device comprises operating the scanner device at the reduced-power mode in response to receiving a hibernation signal from the remote host.

37. The method of claim 32, wherein operating the scanner device comprises operating the scanner device at the reduced-power mode in response to a predetermined period of inactivity.

38. The method of claim 32, further comprising operating the scanner device at the reduced-power mode in response to receiving a power off request for the scanner device.

* * * * *

UNITED STATES PATENT AND TRADEMARK OFFICE
CERTIFICATE OF CORRECTION

| | | |
|---|---|---|
| PATENT NO. | : 8,018,607 B2 | Page 1 of 1 |
| APPLICATION NO. | : 10/310469 | |
| DATED | : September 13, 2011 | |
| INVENTOR(S) | : Gordon R. Nuttall, Jr. et al. | |

It is certified that error appears in the above-identified patent and that said Letters Patent is hereby corrected as shown below:

In column 5, line 35, in Claim 1, after "host," delete "and".

In column 5, line 43, in Claim 1, after "device," insert -- and --.

In column 6, line 18, in Claim 9, after "device;" insert -- and --.

In column 8, line 29, in Claim 32, after "function;" insert -- and --.

Signed and Sealed this
Twenty-fourth Day of July, 2012

David J. Kappos
*Director of the United States Patent and Trademark Office*